(No Model.)
H. MYERS.
WHEEL TIRE.
No. 477,773. Patented June 28, 1892.
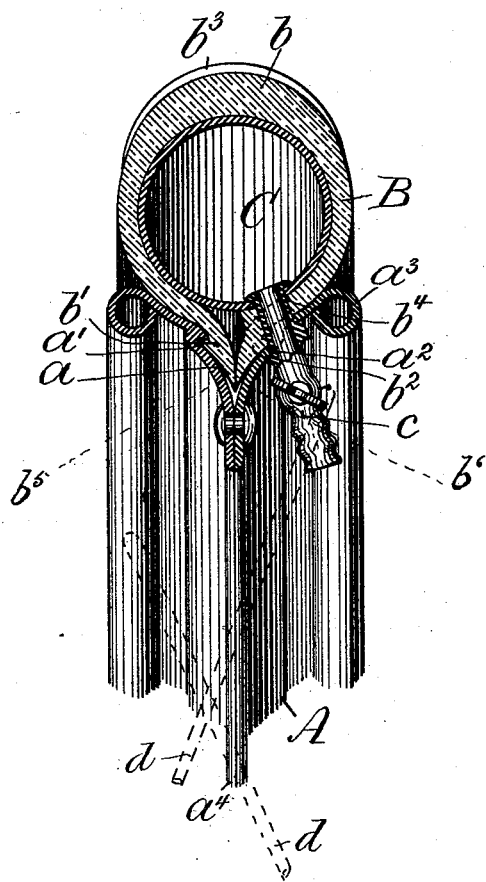
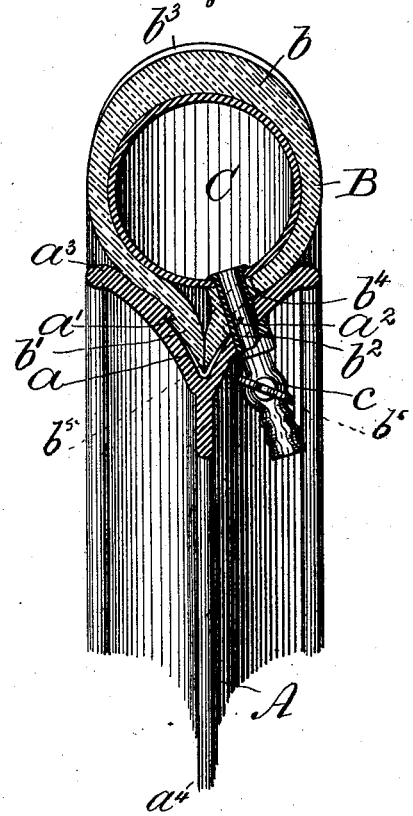
Witnesses.
Hermann Borgmann
Wm O. Shubert
Inventor:
Henry Myers

UNITED STATES PATENT OFFICE.

HENRY MYERS, OF PHILADELPHIA, PENNSYLVANIA.

WHEEL-TIRE.

SPECIFICATION forming part of Letters Patent No. 477,773, dated June 28, 1892.

Application filed March 2, 1892. Serial No. 423,453. (No model.)

*To all whom it may concern:*

Be it known that I, HENRY MYERS, a citizen of the United States, residing at Philadelphia, in the county of Philadelphia and State of Pennsylvania, have invented certain new and useful Improvements in Wheel-Tires, of which the following is a specification.

My invention relates to elastic inflatable wheel-tires used on bicycles or other vehicles.

The object of my invention is to produce an efficient, simple, and comparatively cheap vehicle-tire composed of an inflatable inner tube and an outer tire adapted to be held by a metallic felly.

The invention consists of providing a metal felly composed of one or more parts with an elastic inflatable tire adapted to be held in the metal tire by scarf-joints.

The invention further consists of a metal felly composed of one or more parts and having an elastic or resilient tire portion adapted to be held by the metallic felly by scarf-joints and inflated by an auxiliary tube located within said elastic or resilient tire.

The invention further consists of a flexible tire composed of a flat piece or sheet of elastic material, having a thickened tread portion and on each edge thereof a rabbeted portion forming one member of a scarf-joint, whereof the other member is formed on the metal felly, which is especially adapted to receive and hold the elastic tire, and which elastic tire is supported and strengthened by an inner auxiliary and highly-elastic air-tube.

The invention further consists of the improvements herein set forth, and illustrated in the drawings, in which—

Figure 1 is a view illustrating a cross-section and elevation of my improved tire, in which the metal felly is composed of two parts for supporting the inflatable tire; and Fig. 2 is a similar view showing the metal felly composed of one part.

Referring now to the drawings for a further description of my invention, A is a metal felly made either in two parts riveted or otherwise fastened together, as shown in Fig. 1, or it may be formed in one part, as shown in Fig. 2. This metal felly has a substantially Y-shaped cross-section, and the V-shaped cavity $a$ thereof is provided with rabbeted projections $a'$ and $a^2$, forming one member of scarf-joints hereinafter more fully described. The upper edges $a^3$ of the Y-shaped metal felly are rounded off and are either hollow, as shown in Fig. 1, or solid, as in Fig. 2, and serve for a purpose to be described. The web $a^4$ is provided to strengthen the metal felly A and may be used as the part to which the spokes $d$ are attached. However, if it is desired, the spokes may be secured to the upper edges $a^3$, which are very convenient portions for the purpose.

B is a continuous elastic tire, being made of a flat or suitably-curved endless sheet and provided with a thickened tread portion $b$ and rabbeted projections $b'$ and $b^2$, forming the other members of the scarf-joints of the tire with the felly A, and these projections $b'$ and $b^2$ terminate in the wedge-shaped edges $b^5$ and $b^6$. The tread portion $b$ may, if desired, be provided with cross-ribs $b^3$ or corrugations to avoid slipping of the tire on slippery roadways.

C is an inner continuous auxiliary air-tube composed of highly-elastic material, which is adapted for being inflated by air or other agent by means of a pump (not shown) and the well-known nozzle and stop-cock $c$, and which nozzle may be fastened to the felly A, the tire B, and auxiliary tube in any good manner which will prevent leakage of the auxiliary tube C at this particular point. It may be mentioned, however, that the auxiliary tube C may be cemented to the flap or portion $b^4$ of the tire B at this particular point for the purpose stated.

The tire B may be applied to the felly A very readily in the following manner: The nozzle $c$ being fastened in position on the metal felly A and the tire B and auxiliary air-tube fastened to each other and to the nozzle $c$ and felly A, the tire B is caused to envelop the auxiliary tube C and pressed in position, so that the rabbeted portions $a'$ and $b'$ and $a^2$ and $b^2$ and the wedge-shaped edges $b^5$ and $b^6$ engage with each other. An inflating agent may now be forced into the interior of the tube C, which expands and lies close to the walls of the tire B to support the same. It will be understood that by inflating the tube C and giving and maintaining the tire B in the requisite shape the rabbeted members constituting the scarf-joint of the tire B and felly A engage very firmly and the wedge-shaped edges $b^5$ and $b^6$ are pressed together by the said inflation of the tube C, so that the sheet-tire B will form an air-tight tube, and that its air-tightness will increase with the pressure exerted upon the side walls of said tire B, so that in case the inner tube C should become leaky the tire B itself will form a substitute therefor. If by any reason the tube C is mutilated and requires reparation, the tire B may be easily disengaged from the felly A and the tube C be exposed at the part desired by letting out the inflating agent and unlocking the scarf-joint between the tire B and felly A. If it is desired, the inner or auxiliary tube C may be dispensed with, as the tire B of sheet-rubber will form an air-tight tube, as before stated. The rounded-off edges $a^3$ are provided to prevent cutting of the tire B and to give a broad bearing-surface to the tire.

It will be understood by those skilled in the art to which this invention appertains that slight modifications may be made in the shape of the felly and tire, as well as in the location of the air-nozzle c, without departing from the spirit of the invention.

Having thus described the nature and objects of my invention, what I claim as new, and desire to secure by Letters Patent, is—

1. An inflatable tire composed of a flat endless sheet of elastic material adapted to be sprung into a V-shaped metal felly, said felly provided with projections adapted to engage similar projections on the flat endless elastic sheet to form an air-tight continuous inflatable tire, substantially as and for the purposes set forth.

2. An inflatable tire composed of a flat endless sheet of elastic material having beveled-off edges, said edges provided with projections adapted to engage similar projections on a V-shaped metal felly to form a continuous air-tight inflatable tire, substantially as and for the purposes set forth.

3. An inflatable tire composed of a flat endless sheet of elastic material adapted to be sprung into a V-shaped metal felly and held therein by scarf-joints formed by projections or spurs on the tire and felly, so as to form an air-tight continuous tube, and an inflatable tube located within said tire, substantially as and for the purposes set forth.

In witness whereof I have hereunto set my signature in the presence of two subscribing witnesses.

HENRY MYERS.

Witnesses:
WM. P. SHIBER,
ADAM C. ACKERMAN.